(12) United States Patent
Takaki et al.

(10) Patent No.: US 9,759,165 B2
(45) Date of Patent: Sep. 12, 2017

(54) INTERNAL COMBUSTION ENGINE

(71) Applicant: NISSAN MOTOR CO., LTD., Yokohama-shi, Kanagawa (JP)

(72) Inventors: Daisuke Takaki, Yokohama (JP); Hirofumi Tsuchida, Yokosuka (JP); Takeshi Tsuyuki, Hadano (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/414,201

(22) PCT Filed: May 31, 2013

(86) PCT No.: PCT/JP2013/065233
§ 371 (c)(1),
(2) Date: Jan. 12, 2015

(87) PCT Pub. No.: WO2014/013803
PCT Pub. Date: Jan. 23, 2014

(65) Prior Publication Data
US 2015/0233326 A1    Aug. 20, 2015

(30) Foreign Application Priority Data
Jul. 18, 2012    (JP) .................................. 2012-159209

(51) Int. Cl.
*F02M 26/09*    (2016.01)
*F02M 26/14*    (2016.01)
(Continued)

(52) U.S. Cl.
CPC ...... *F02M 25/0712* (2013.01); *F02M 25/072* (2013.01); *F02M 25/0717* (2013.01); *F02M 25/0726* (2013.01); *F02M 25/0754* (2013.01)

(58) Field of Classification Search
CPC ............ F02M 25/0707; F01N 2560/07; F01N 2560/08; F01N 11/002; F01N 11/005;
(Continued)

(56) References Cited

U.S. PATENT DOCUMENTS 5,190,017 A * 3/1993 Cullen ................... F02M 26/49
123/568.16
5,488,938 A * 2/1996 Ohuchi ............... F02D 41/0055
123/568.16
(Continued)

FOREIGN PATENT DOCUMENTS

EP    1741885 A2    1/2007
EP    1870584 A2    12/2007
(Continued)

*Primary Examiner* — Phutthiwat Wongwian
*Assistant Examiner* — Jessica Kebea
(74) *Attorney, Agent, or Firm* — Drinker Biddle & Reath LLP

(57) ABSTRACT

An upper-limit threshold value and a lower-limit threshold value of a fore-and-aft differential pressure of an EGR control valve is calculated based on an intake-air quantity detected by an airflow meter. An actual fore-and-aft differential pressure of the EGR control valve is calculated from detected values of an upstream-side pressure sensor and a downstream-side pressure sensor. Then, these threshold values are compared with the actual fore-and-aft differential pressure, and when the actual fore-and-aft differential pressure exceeds the upper-limit threshold value or when the actual fore-and-aft differential pressure is less than the lower-limit threshold value, it is determined that the pressure loss of an intake and exhaust system has changed. If it is determined that the pressure loss of an intake and exhaust system has changed, EGR is inhibited, and if not so, EGR is permitted to be performed. These threshold values are varied depending on a target EGR rate.

4 Claims, 4 Drawing Sheets

(51) Int. Cl.
*F02M 26/17* (2016.01)
*F02M 26/22* (2016.01)
*F02M 26/48* (2016.01)
*F02M 26/49* (2016.01)
*F02M 26/47* (2016.01)
*F02M 25/07* (2006.01)

(58) Field of Classification Search
CPC ........ F01N 9/005; F01N 9/007; G01M 15/09;
G01M 15/10; G01M 15/102; G01M
15/106; F02D 41/0072; F02D 41/0075
USPC ...................................................... 60/605.2
See application file for complete search history.

(56) References Cited

U.S. PATENT DOCUMENTS

| | | | | |
|---|---|---|---|---|
| 5,964,820 A * | 10/1999 | Miwa | ................ | F02D 41/0072 123/568.16 |
| 6,763,708 B2 * | 7/2004 | Ting | ................ | F02D 41/0072 73/114.37 |
| 6,850,833 B1 * | 2/2005 | Wang | ................ | F02D 41/0055 123/568.12 |
| 6,868,329 B2 * | 3/2005 | Ito | ................ | F02B 37/16 123/406.48 |
| 6,993,909 B2 * | 2/2006 | Matsunaga | ......... | F02D 41/0072 123/568.12 |
| 7,822,531 B2 * | 10/2010 | Alger, II | ............. | F02B 29/0437 123/299 |
| 7,946,117 B2 * | 5/2011 | Atkinson | ............. | F01N 3/0205 123/568.19 |
| 8,091,535 B2 * | 1/2012 | Nitzke | ................ | F02D 9/04 123/568.12 |
| 9,261,052 B2 * | 2/2016 | Saitoh | ................ | F02M 26/47 |
| 2008/0078176 A1 * | 4/2008 | de Ojeda | ............... | F02D 21/08 60/605.2 |
| 2008/0163855 A1 * | 7/2008 | Matthews | ............. | F01N 13/009 123/568.12 |
| 2009/0277431 A1 * | 11/2009 | Nitzke | ................ | F02D 9/04 123/568.12 |
| 2010/0089371 A1 | 4/2010 | Shibata et al. | | |
| 2011/0048001 A1 | 3/2011 | Nagae | | |
| 2013/0074494 A1 * | 3/2013 | Chi | ................ | F02M 25/0707 60/605.2 |

FOREIGN PATENT DOCUMENTS

| | | | |
|---|---|---|---|
| JP | 2000-356162 A | | 12/2000 |
| JP | 2008-223554 A | | 9/2008 |
| JP | 2011-163241 A | | 8/2011 |
| JP | 2012197681 A | * | 10/2012 |
| JP | 2012251509 A | * | 12/2012 |
| JP | 2013181425 A | * | 9/2013 |

* cited by examiner

INTERNAL COMBUSTION ENGINE

TECHNICAL FIELD

The present invention relates to an internal combustion engine configured to recirculate a part of exhaust gas to the upstream side of a supercharger.

BACKGROUND ART

A technology, in which an exhaust performance and fuel economy can be enhanced or improved by performing EGR (exhaust-gas recirculation) for introducing a part of exhaust gas into an intake system depending on an operating condition in an internal combustion engine equipped with an EGR passage connected to an exhaust passage and an intake passage and an EGR control valve disposed in the EGR passage, is generally known.

On the assumption that the differential pressure (the pressure difference) between an intake pressure in the intake passage at a position of the intake passage at which the EGR passage is connected and an exhaust pressure in the exhaust passage at a position of the exhaust passage at which the EGR passage is connected is kept constant, the amount of EGR, introduced into the intake passage, is determined depending on the opening degree of the EGR valve disposed in the EGR passage. In such internal combustion engines configured to perform EGR, when being used for a long period of time, an EGR rate, determined depending on the opening of the EGR valve, tends to vary from a desired value owing to a change in pressure loss of an intake and exhaust system. Hence, there is a possibility that the amount of EGR, actually recirculated, deviates from a target value.

Therefore, Patent document 1 teaches a technology that makes a diagnosis on the presence or absence of a change in pressure loss of an intake and exhaust system based on a variation of intake temperature before and after the amount of EGR, which is introduced into an intake passage, is varied in a given transient state.

However, in making a diagnosis on the presence or absence of a change in pressure loss of an intake and exhaust system based on a variation of intake temperature, suppose that the temperature of EGR gas, introduced into the intake passage, is low. In such a case, a variation of temperature of intake air, occurring due to the EGR gas sent back, becomes smaller. For that reason, in the case that an EGR cooler is installed in the EGR passage such that the EGR gas, introduced into the intake passage, is cooled, there is a possibility that it is difficult to make a diagnosis on the presence or absence of pressure loss in an intake and exhaust system based on a variation of intake temperature.

CITATION LIST

Patent Literature

Patent document 1: Japanese Patent Provisional Publication No. 2008-223554

SUMMARY OF INVENTION

Technical Problem

Hence, the invention is characterized in that, in an internal combustion engine in which a part of exhaust gas is recirculated as EGR (exhaust-gas recirculation) by way of the upstream side of a supercharger, a change in pressure loss of an intake and exhaust system is detected by comparing an estimated fore-and-aft pressure difference of an EGR control valve, estimated based on an intake-air quantity, with an actual fore-and-aft differential pressure of the EGR control valve, actually measured.

According to the invention, it is possible to detect a change in pressure loss of the intake and exhaust system, owing to which the amount of EGR may vary from a desired value, regardless of the temperature of EGR gas introduced into the intake passage, even with an EGR control valve whose opening is kept constant.

DESCRIPTION OF EMBODIMENTS

Figure 1:
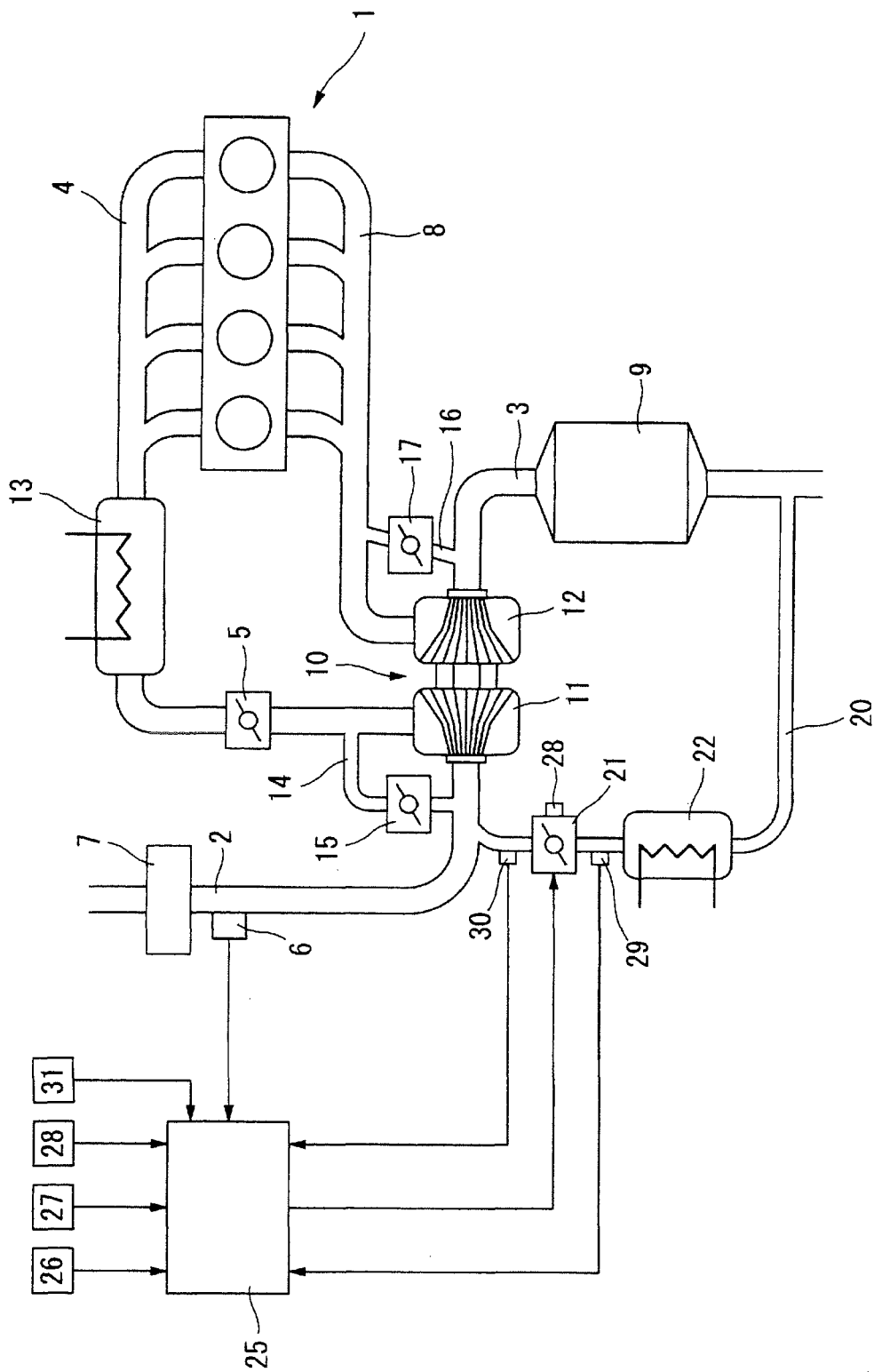
FIG. 1 is a system diagram illustrating the schematic system configuration of an internal combustion engine to which the invention can be applied.

One embodiment of the invention is hereinafter described in reference to the drawings. FIG. 1 shows the schematic system configuration of an internal combustion engine 1 to which the invention can be applied.

In the internal combustion engine 1, which has been mounted on a vehicle such as an automotive vehicle as a driving power source, an intake passage 2 and an exhaust passage 3 are connected to the engine. A throttle valve 5 is installed in the intake passage 2, which is connected through an intake manifold 4 to the internal combustion engine 1. An airflow meter 6, which is configured to detect an intake-air quantity, and an air cleaner 7 are both installed upstream of the throttle valve. An exhaust catalyst 9 for exhaust gas purification, such as a three-way catalyst, is installed in the exhaust passage 3, which is connected through an exhaust manifold 8 to the internal combustion engine 1.

Also, the internal combustion engine 1 has a turbo-supercharger 10 equipped with a compressor 11 arranged in the intake passage 2 and a turbine 12 arranged in the exhaust passage 3. The compressor and the turbine are coaxially arranged with each other. Compressor 11 is located upstream of the throttle valve 5, and also located downstream of the airflow meter 6. Turbine 12 is located upstream of the exhaust catalyst 9. By the way, a component part, denoted by reference sign 13 in FIG. 1, is an intercooler located downstream of the throttle valve 5.

A recirculation passage 14 is connected to the intake passage 2 so as to connect the upstream and downstream sides of the compressor, while bypassing the compressor 11. A recirculation valve 15 is installed in the recirculation passage 14 for controlling a flow rate of intake air flowing through the recirculation passage.

An exhaust bypass passage 16 is connected to the exhaust passage 3 so as to connect the upstream and downstream sides of turbine 12, while bypassing the turbine 12. A waste gate valve 17 is installed in the exhaust bypass passage 16 for controlling a flow rate of exhaust gas flowing through the exhaust bypass passage 16.

Internal combustion engine 1 is configured to permit exhaust-gas recirculation (EGR) to be performed. An EGR passage 20 is provided between the exhaust passage 3 and the intake passage 2. One end of the EGR passage is connected to the exhaust passage 3 at a downstream position of the exhaust catalyst 9. The other end of the EGR passage is connected to the intake passage 2 downstream of the air cleaner 7 and upstream of the compressor 11. An electronically-controlled EGR control valve 21 and an EGR cooler 22 are installed in the EGR passage 20. The opening of EGR control valve 21 is controlled by a control unit 25 so as to obtain a given EGR rate corresponding to an operating condition.

In addition to the previously-discussed signal detected by airflow meter 6, control unit 25 receives input information about sensor signals detected by a variety of sensors, that is, a crank-angle sensor 26, an accelerator-opening sensor 27, an EGR control valve opening sensor 28, an upstream-side pressure sensor 29, a downstream-side pressure sensor 30, a knock sensor 31, and the like. The crank-angle sensor is provided for detecting a crankangle of a crankshaft (not shown). The accelerator-opening sensor is provided for detecting an amount of depression of an accelerator (not shown). The EGR control valve opening sensor is provided for detecting the opening of EGR control valve 21. Upstream-side pressure sensor 29 is provided for detecting a pressure P1 in the EGR passage 20 upstream of the EGR control valve 21. Downstream-side pressure sensor 30 is provided for detecting a pressure P2 in the EGR passage 20 downstream of the EGR control valve 21. Knock sensor 31 is provided for detecting knocking.

On the basis of these detection signals, control unit 25 executes ignition timing control and air/fuel (A/F) ratio control of internal combustion engine 1, and also executes exhaust-gas recirculation control (EGR control) for recirculating a part of exhaust gas from the exhaust passage 3 to the intake passage 2 by controlling the opening of EGR control valve 21. By the way, the openings of throttle valve 5, recirculation valve 15, and waste gate valve 17 are also controlled by means of the control unit 25. Instead of using this type of recirculation valve 15 whose opening or closing can be controlled by the control unit 25, a so-called check valve, which is configured to open only when the downstream-side pressure of compressor 11 becomes greater than or equal to a predetermined pressure value, may be used.

In the case of the system configuration in which exhaust gas recirculated is introduced by way of the upstream side of the compressor 11 of turbo-supercharger 10, which compressor is arranged in the intake passage 2, EGR gas is introduced by the pressure difference between an exhaust pressure Pe in the exhaust passage 3 at a position of the exhaust passage at which the EGR passage 20 is connected and an intake pressure Pi in the intake passage 2 at a position of the intake passage at which the EGR passage 20 is connected.

On the basis of a Bernoulli's theorem, there is a proportional relation between an intake-air quantity and a square root of the pressure difference between exhaust pressure Pe and intake pressure Pi. Additionally, there is a proportional relation between a square root of the pressure difference between exhaust pressure Pe and intake pressure Pi and an EGR amount (an amount of exhaust-gas recirculation). Therefore, there is a proportional relation between an intake-air quantity and an EGR amount (in other words, a fixed EGR rate). That is to say, in the case of the system configuration in which a part of exhaust gas is recirculated or sent back to the intake passage 2, utilizing the pressure difference between exhaust pressure Pe and intake pressure Pi, on the assumption that the opening (the opening area) of EGR control valve 21 is kept constant, the ratio of the intake-air quantity and the EGR amount becomes constant even when the intake-air quantity varies, and thus the EGR rate becomes constant.

However, for instance when the pressure loss of an intake and exhaust system of internal combustion engine 1 changes owing to a hole formed in a muffler (not shown) of the exhaust system caused by corrosion or owing to clogging of the air cleaner 7, and thus the pressure difference of intake pressure Pi and exhaust pressure Pe changes, the EGR rate, corresponding to the opening (the opening area) of EGR control valve 12, also changes. As a result, the EGR amount, actually recirculated into the intake passage 2, deviates from a target EGR amount.

Hence, in the shown embodiment, the presence or absence of a change in pressure loss of an intake and exhaust system of internal combustion engine 1 is determined by comparing an estimated pressure difference serving as an index of a fore-and-aft pressure difference of EGR control valve 21, estimated based on the intake-air quantity, with an actual fore-and-aft differential pressure of EGR control valve 21, actually measured by upstream-side pressure sensor 29 and downstream-side pressure sensor 30 and derived from detected values of these pressure sensors.

In the case that a change in pressure loss of the intake and exhaust system of internal combustion engine 1 increases and thus there is a possibility for a misfire or knocking to occur, EGR is inhibited.

Concretely, when the pressure loss in the intake and exhaust system increases and thus the actual fore-and-aft differential pressure exceeds an upper-limit threshold value, determined based on latest up-to-date information about the intake-air quantity, the actual EGR amount, introduced into the intake passage 2, tends to increase relatively to the target EGR amount (that is, an actual EGR rate tends to increase relatively to a target EGR rate). Therefore, to avoid a misfire, EGR is inhibited. When the pressure loss in the intake and exhaust system decreases and thus the actual fore-and-aft differential pressure is less than a lower-limit threshold value, determined based on latest up-to-date information about the intake-air quantity, the actual EGR amount, introduced into the intake passage 2, tends to decrease relatively to the target EGR amount (that is, the actual EGR rate tends to decrease relatively to the target EGR rate). Therefore, to avoid knocking, EGR is inhibited.

In this manner, it is possible to detect a change in pressure loss of the intake and exhaust system, owing to which the amount of EGR may vary from a desired value, regardless of the temperature of EGR gas introduced into the intake passage 2, even with the EGR control valve 21 whose opening is kept constant, by comparing the actual fore-and-aft differential pressure with each of the estimated upper-limit threshold value and the estimated lower-limit threshold value.

Figure 2:
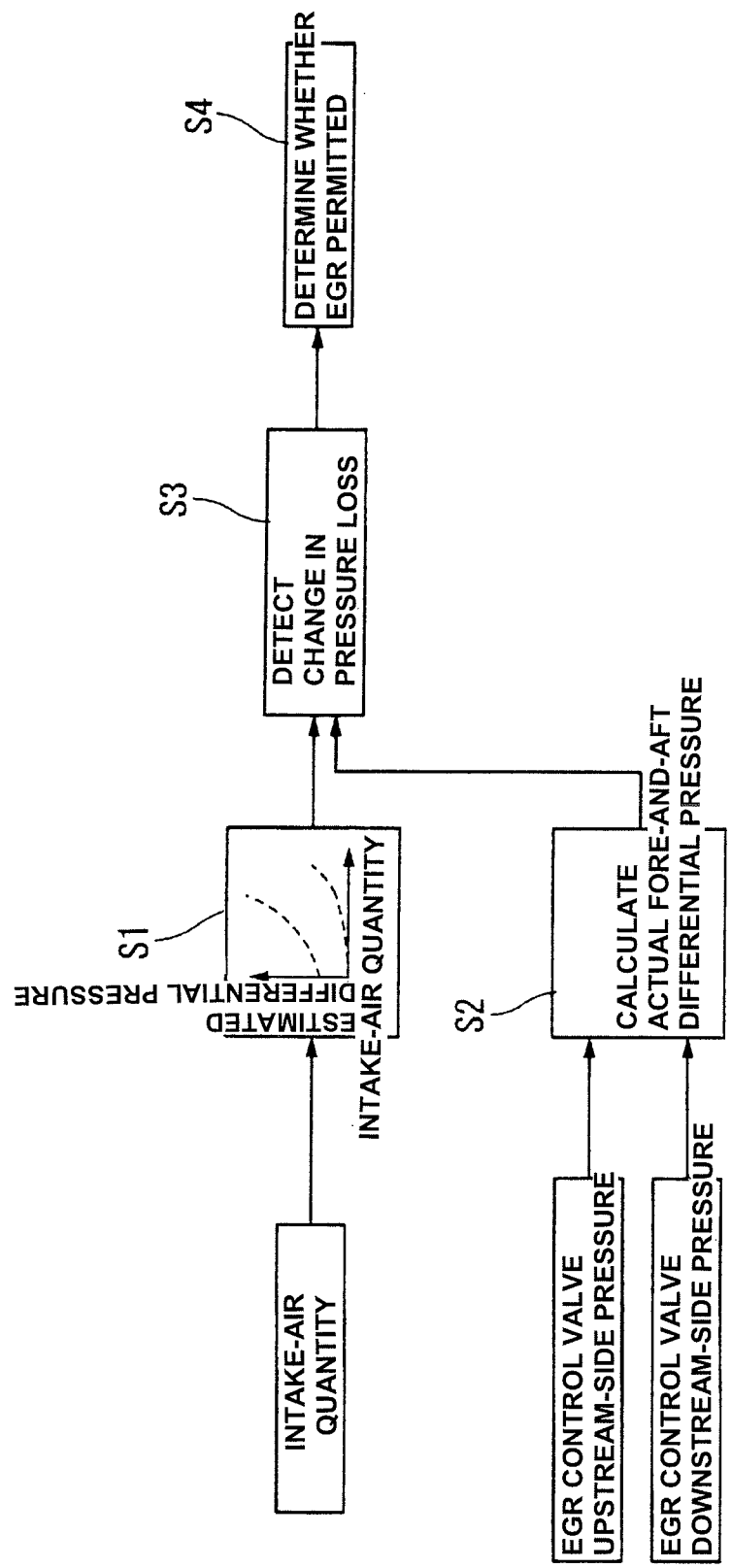
FIG. 2 is a block diagram illustrating control contents of the first embodiment.

Referring to FIG. 2, there is shown the block diagram illustrating control contents of internal combustion engine 1 of the first embodiment.

At step S1, an upper-limit threshold value and a lower-limit threshold value of a fore-and-aft differential pressure of EGR control valve 21 are calculated or estimated based on an intake-air quantity detected by airflow meter 6. At step S2, an actual fore-and-aft differential pressure of EGR control valve 21 is calculated from detected values of upstream-side pressure sensor 29 and downstream-side pressure sensor 30.

At step S3, a change in pressure loss in an intake and exhaust system is detected by comparing the upper-limit threshold value and the lower-limit threshold value, calculated at step S1, with the actual fore-and-aft differential pressure, calculated at step S2. That is, when the actual fore-and-aft differential pressure exceeds the upper-limit threshold value or when the actual fore-and-aft differential pressure is less than the lower-limit threshold value, it is determined that the pressure loss in the intake and exhaust system has changed.

At step S4, EGR control is executed by reference to the determination result at step S3. That is, when step S3 determines that the pressure loss in the intake and exhaust system has changed, EGR is inhibited (disabled). If not so, EGR is permitted (enabled) to be performed.

By the way, in the previously-discussed embodiment, as an estimated pressure difference, an upper-limit threshold value and a lower-limit threshold value are calculated based on an intake-air quantity. In lieu thereof, as an estimated pressure difference, a fore-and-aft differential pressure of EGR control valve 21 itself, that is, an estimated fore-and-aft differential pressure, may be calculated based on an intake-air quantity. In such a case, a determination that the pressure loss in an intake and exhaust system has changed may be made, when the actual fore-and-aft differential pressure deviates from the estimated fore-and-aft differential pressure by a divergence rate greater than a prescribed rate.

For instance when the opening degree of EGR control valve 21 becomes a fully-open state, EGR gas is introduced into the intake passage 2 by the pressure difference between the intake pressure Pi in the intake passage 2 at the position of the intake passage at which the EGR passage 20 is connected and the exhaust pressure Pe in the exhaust passage 3 at the position of the exhaust passage at which the EGR passage 20 is connected, but the fore-and-aft differential pressure of EGR control valve 21 tends to become smaller. Therefore, it is difficult to determine whether the smaller fore-and-aft differential pressure is caused by a change in the pressure loss in the intake and exhaust system. That is, the fore-and-aft differential pressure of EGR control valve 21 tends to relatively decrease, as the opening degree of EGR control valve 21 increases. Therefore, it is difficult to determine whether the decreased fore-and-aft differential pressure is caused by a change in the pressure loss in the intake and exhaust system.

Hence, when the actual fore-and-aft differential pressure is less than the lower-limit threshold value, for the purpose of determining whether the fore-and-aft differential pressure decrease of EGR control valve 21 is caused by a change in the pressure loss in the intake and exhaust system or whether the fore-and-aft differential pressure decrease of EGR control valve 21 is caused by a valve-opening abnormality occurring due to a failure in EGR control valve 21, a diagnosis on a factor of the fore-and-aft differential pressure decrease may be executed in combination, using latest up-to-date information about the actual opening of EGR control valve 21, detected by the EGR control valve opening sensor 28.

Concretely, when the actual opening of EGR control valve 21 does not deviate from a target opening degree by a divergence rate greater than a prescribed rate, it is determined that the actual fore-and-aft differential pressure becomes reduced to below the lower-limit threshold value due to a change in the pressure loss in the intake and exhaust system. In contrast, when the actual opening of EGR control valve 21 deviates from a target opening degree by a divergence rate greater than a prescribed rate, and thus the actual opening becomes an opening degree widely opened toward the valve-open side with respect to the target opening degree, it is determined that the actual fore-and-aft differential pressure becomes reduced to below the lower-limit threshold value due to a failure in EGR control valve 21. Then, the determination result is stored in the control unit 25. Thereafter, when performing maintenance and inspection at a maintenance shop and the like, the stored determination result may be verified by the use of an electronic system diagnosis tester (a so-called CONSULT).

By the way, when executing a diagnosis on a factor of the fore-and-aft differential pressure decrease, there is a possibility of the occurrence of knocking during execution of such a diagnosis on a factor of the fore-and-aft differential pressure decrease. Therefore, at the point of time when it has been determined that the fore-and-aft differential pressure is less than the lower-limit threshold value, to avoid knocking it is preferable to retard ignition timing by a given timing value. Then, at the point of time when the diagnosis on a factor of the fore-and-aft differential pressure decrease has terminated, EGR should be stopped.

By the way, when knocking avoidance control is executed to suppress the occurrence of knocking by retarding ignition timing upon detection of knocking, in executing such knocking avoidance control, an upper limit of phase-retard quantity (i.e., a phase-retard limit) should be set such that ignition timing cannot be retarded greater than a predetermined timing value with respect to a set value (target ignition timing). The phase-retard limit of ignition timing is determined for every operating point of internal combustion engine 1. That is, the phase-retard limit of ignition timing is determined based on engine revolution speed and engine load.

Figure 3:
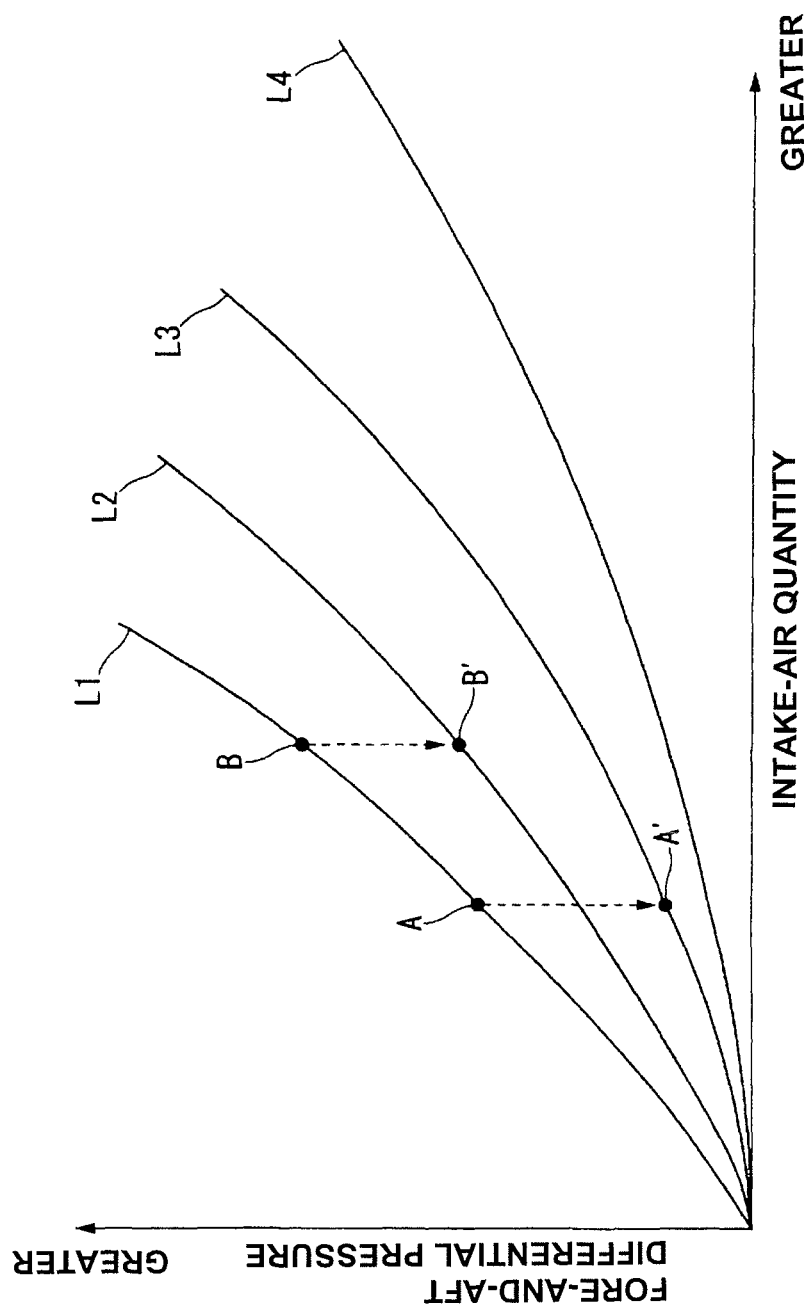
FIG. 3 is an explanatory diagram schematically illustrating another embodiment.

By the way, an EGR rate can be estimated based on a fore-and-aft differential pressure of EGR control valve 21 and an intake-air quantity. As shown in FIG. 3, assuming that the axis of ordinate is taken as a fore-and-aft differential pressure of EGR control valve 21, and the axis of abscissa is taken as an intake-air quantity, it is possible to draw characteristic curves corresponding to respective EGR rates. Characteristic curves L1-L4, shown in FIG. 3, are different characteristic curves corresponding to respective EGR rates. L1 denotes an EGR rate of 10%, L2 denotes an EGR rate of 7%, L3 denotes an EGR rate of 5%, and L4 denotes an EGR rate of 3%.

Hence, for instance assuming that a fore-and-aft differential pressure and an intake-air quantity correspond to the point "A" in FIG. 3 and a phase-retard limit (a maximum phase-retard quantity) of ignition timing at this operating condition (this operating point) is 5% in terms of a deviation of the EGR rate, a fore-and-aft differential pressure at the point "A'" in FIG. 3 is set as a lower-limit threshold value. Over again, for instance assuming that a fore-and-aft differential pressure and an intake-air quantity correspond to the point "B" in FIG. 3 and a phase-retard limit (a maximum phase-retard quantity) of ignition timing at this operating condition (this operating point) is 3% in terms of a deviation of the EGR rate, a fore-and-aft differential pressure at the point "B'" in FIG. 3 is set as a lower-limit threshold value.

That is, a phase-retard limit of ignition timing for every operating point is converted into a permissible EGR-rate deviation amount corresponding to a deviation of the EGR rate as discussed previously, and then a lower-limit threshold value may be changed responsively to the converted permissible EGR-rate deviation amount, converted for every operating point. Hereupon, the permissible EGR-rate deviation amount is an EGR-rate deviation width that permits knocking to be avoided by knocking avoidance control even when the EGR rate deviates from its target EGR rate.

As discussed previously, the fore-and-aft differential pressure of EGR control valve 21 is affected by the opening of EGR control valve 21. Thus, as shown in FIG. 4, an upper-limit threshold value and a lower-limit threshold value may be changed depending on the opening of EGR control valve 21.

Figure 4:
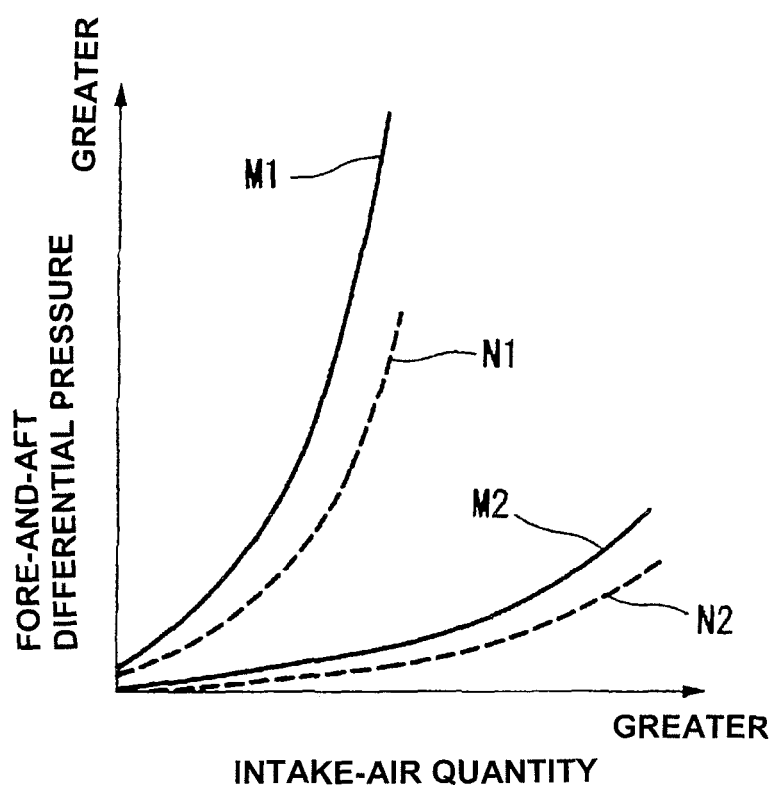
FIG. 4 is an explanatory diagram schematically illustrating a further embodiment.

Referring to FIG. 4, there is shown the explanatory view comparatively illustrating an upper-limit threshold value and a lower-limit threshold value in the case that the opening of EGR control valve 21 is small and an upper-limit threshold value and a lower-limit threshold value in the case that the opening of EGR control valve 21 is large, on the assumption that a phase-retard limit of ignition timing is fixed regardless of operating conditions.

A characteristic curve M1, indicated by the solid line in FIG. 4, is an upper-limit threshold value when the opening of EGR control valve 21 is a given small opening, whereas a characteristic curve M2, indicated by the solid line in FIG. 4, is a lower-limit threshold value when the opening of EGR control valve 21 is the given small opening. Also, a characteristic curve N1, indicated by the broken line in FIG. 4, is an upper-limit threshold value when the opening of EGR control valve 21 is a given large opening, whereas a characteristic curve N2, indicated by the broken line in FIG. 4, is a lower-limit threshold value when the opening of EGR control valve 21 is the given large opening. In this manner, the upper-limit threshold value and the lower-limit threshold value may be set to relatively decrease, in accordance with an increase in the opening of EGR control valve 21.

Furthermore, the upper-limit threshold value and the lower-limit threshold value are changed depending on the opening of EGR control valve 21. At the same time, regarding the lower-limit threshold value a phase-retard limit of ignition timing for every operating point is first converted into a permissible EGR-rate deviation amount corresponding to a deviation of the EGR rate, and then the lower-limit threshold value may be changed responsively to the converted permissible EGR-rate deviation amount, converted for every operating point.

The invention claimed is:

1. An internal combustion engine comprising:
   a supercharger located upstream of a throttle valve;
   an exhaust gas recirculation (EGR) passage configured to introduce a part of exhaust gas into an intake passage by way of an upstream side of the supercharger;
   an EGR control valve disposed in the EGR passage; and
   a control unit configured to:
   detect a change in pressure loss of an intake and exhaust system by comparing an upper-limit threshold value of the EGR control valve and a lower-limit threshold value of the EGR control valve with a currently-measured actual fore-and-aft differential pressure before and after the EGR control valve, the upper-limit threshold value and the lower-limit threshold value being estimated based on an intake air quantity,
   calculate the upper-limit threshold value of the EGR control valve for determining an abnormal increase in pressure loss of the intake and exhaust system, and the lower-limit threshold value of the EGR control valve for determining an abnormal decrease in pressure loss of the intake and exhaust system,
   determine that the abnormal increase in pressure loss has occurred when the currently-measured actual fore-and-aft differential pressure of the EGR control valve exceeds the upper-limit threshold value, and
   determine that the abnormal decrease in pressure loss has occurred when the currently-measured actual fore-and-aft differential pressure of the EGR control valve is below the lower-limit threshold value,
   wherein the control unit is configured to vary and update the upper-limit threshold value and the lower-limit threshold value depending on a target EGR rate, and
   wherein the control unit is configured to adjust the EGR control valve for inhibiting exhaust-gas recirculation, when the currently-measured actual fore-and-aft differential pressure of the EGR control valve exceeds the upper-limit threshold value or when the currently measured actual fore-and-aft differential pressure of the EGR control valve is below the lower-limit threshold value.

2. An internal combustion engine as recited in claim 1, which further comprises:
   an EGR control valve opening sensor configured to detect an actual opening of the EGR control valve,
   wherein, in the case of the currently-measured actual fore-and-aft differential pressure of the EGR control valve being less than the lower-limit threshold value, the control unit is configured to determine that the abnormal decrease in pressure loss of the intake and exhaust system has occurred when the actual opening of the EGR control valve has an opening degree that does not deviate from a target opening degree by a divergence rate greater than a prescribed rate, and determine that a failure in the EGR control valve has occurred when the actual opening of the EGR control valve has an opening degree that deviates from the target opening degree by a divergence rate greater than the prescribed rate.

3. An internal combustion engine as recited in claim 2, wherein:
   in the case of the currently-measured actual fore-and-aft differential pressure of the EGR control valve being less than the lower-limit threshold value, the control unit performs said step of determining, based on the actual opening of the EGR control valve, whether the abnormal decrease in pressure loss of the intake and exhaust system or a failure in the EGR control valve has occurred, after having retarded ignition timing of the internal combustion engine.

4. An internal combustion engine as recited in claim 1, which further comprises:
   a knock sensor configured to detect knocking of the internal combustion engine,
   wherein the control unit is configured to:
   retard ignition timing of the internal combustion engine upon detection of knocking, for knocking avoidance control, and
   wherein the control unit is further configured to vary the lower-limit threshold value depending on a phase-retard limit of ignition timing during the knocking avoidance control.

* * * * *